April 9, 1929.  W. W. EVANS  1,708,127

TREAD MEMBER FOR FOOTWEAR

Filed Sept. 26, 1927

Inventor,
Walter W. Evans
By Pierson, Eakin & Avery
Attys.

Patented Apr. 9, 1929.

1,708,127

UNITED STATES PATENT OFFICE.

WALTER W. EVANS, OF NEW ROCHELLE, NEW YORK, ASSIGNOR TO THE B. F. GOODRICH COMPANY, OF NEW YORK, N. Y., A CORPORATION OF NEW YORK.

TREAD MEMBER FOR FOOTWEAR.

Application filed September 26, 1927. Serial No. 221,987.

This invention relates to cushioned wear or tread members such as heels and soles for footwear and to analogous articles and especially to tread members such as are secured to shoes by nails, stitches or like fastenings.

Heretofore, so far as I am aware, the nearest approach to my invention as applied to footwear has been the use of a practically unyielding and substantially impervious wooden reinforcement or core, comprising in its best form a plurality of plies of hard wood having their grains crossed, the core being embedded in the rubber of the heel and serving as an achorage for the heads of the nails. Such cores have had advantages over the use of individual metal anchorages for the respective nails, in that the positioning of the nails is not closely restricted, the wooden core holds the upper region of the heel to form so that gapping of the heel from the shoe is avoided and a neat appearance is maintained and the wood is inexpensive in comparison with the rubber that it replaces, but the wooden cores heretofore used, so far as I am aware, have been of dense, comparatively non-porous wood, and have required the use of an adhesive for securing them in the rubber cushion body of the heel. The use of the adhesive has been a matter of expense, both as to cost of the material and as to the operation of incorporating it in the heel, and the plying of the wood also has been an item of expense.

My chief objects are to provide an improved and inexpensive method of making a tread member for footwear comprising a cushion body of rubber or the like and a core or insert embedded therein and constituting a reinforcement of backing member to serve as an anchorage for fastening means and adapted to be nailed or stitched through at any position, and to provide an improved and inexpensive tread member of that character. Further objects are economically to provide a tread member having transverse stiffness and longitudinal flexibility, which are desirable in both soles and heels, in that the longitudinal flexibility permits a yielding of the member in service such as to avoid slippage and consequent abrasion of the tread surface and also makes the boot or shoe more comfortable to wear, and the lateral stiffness, as in the case of the ply-wood heels above mentioned, prevents downward bulging and consequent local wear of the tread surface, prevents gapping of the tread member from the boot or shoe, and preserves a neat appearance of the structure.

In the preferred form of my invention I attain these objects by employing a porous or pervious core or backing member having its elements so disposed in general parallelism as to be stiff in one direction and flexible in the other and securely embed and anchor the core member in a cushion body of rubber or the like by so molding the cushion body onto the core member under pressure as to cause the material of the cushion body to interlock with the elements of the core member. I find that yucca wood provides a material, requiring but little expense in preparation, which is well adapted for use in the core or backing member, this wood being highly porous, with its fibers all lying in the same general direction and with the interstices between the fibers so large that an ordinary rubber heel composition readily may be forced far into the wood by molding pressure in the vulcanization of the heel or sole.

The wood readily may be worked into the form of cores, as it possesses both flexibility and toughness across-the-grain such that an extensive sheet, suitable for the stamping of cores therefrom without plying, can be shaved from a log by a spiral cut.

A shoe heel embodying and made in accordance with my invention in its preferred form is shown in the accompanying drawings, in which Fig. 1 is a reverse plan view of the heel with a part sectioned and broken away.

Referring first to Figs. 1 to 4, in the preferred embodiment here shown the core comprises a single piece of yucca wood 10, upon which is molded a rubber cushion body 11, the rubber being forced into the pores of the wood in the form of threads or tendrils 12, which fill and interlock with the walls of the pores, providing secure local anchorage of the cushion body to the core throughout the extent of the latter without the use of an adhesive and yet with substantially as complete a joinder of the surfaces as is provided by an adhesive.

The core in this embodiment is disposed with its grain extending transversely of the heel, so as to give the desirable features of transverse stiffness and longitudinal flexibility above discussed.

Figure 1:
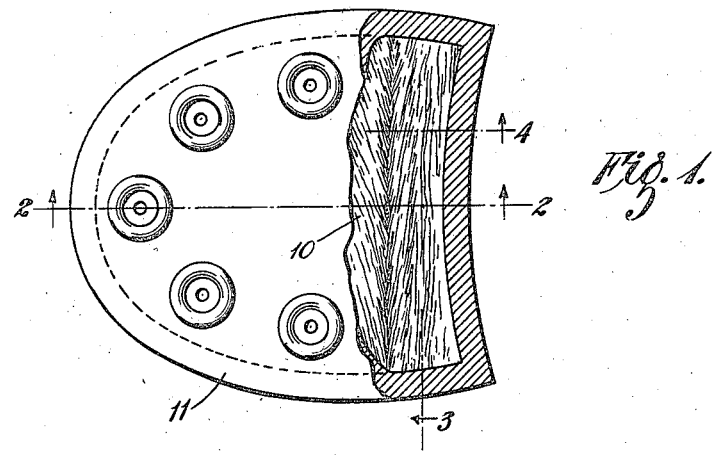
Figure 2:
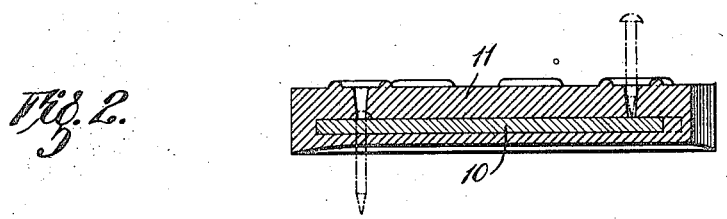
Fig. 2 is a section on line 2—2 of Fig. 1.
Figures 3, 4:
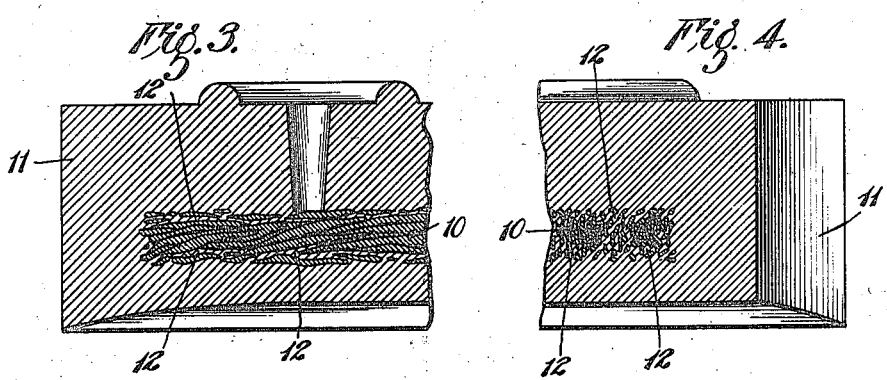
Fig. 3 is a fragmentary vertical section of the heel taken in a plane parallel with the grain of the core showing the penetration of the wood by the rubber.
Fig. 4 is a similar section taken across-the-grain.
Figure 5:
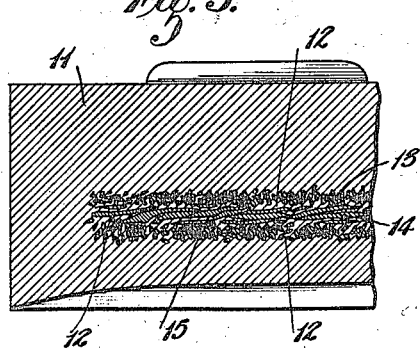
Fig. 5 is a vertical section of a modification.

In the modification shown in Fig. 5 the core comprises three sheets or plies of yucca wood, 13, 14, 15, assembled in stacked or plied up relation with the grain of adjacent plies crossed, so that they reinforce each other, and the plies are bonded together by rubber forced into and through them in the molding operation.

In both forms the heel preferably is produced by simply placing in the cavity of the mold the piece or pieces of the yucca wood with a suitable blank of rubber composition on each side thereof and molding and vulcanizing the rubber about the core under such pressure as to cause the rubber to flow entirely about and to penetrate the wood, which also has the effect of compressing the porous wood and thus rendering it more dense so that its resistance to passage of the nail heads or stitches therethrough is increased.

Substantially the same procedure is employed in producing soles having similar cores or backing members embedded therein.

My invention is susceptible of further modification without sacrifice of all of the advantages above set out and I do not wholly limit my claims to the specific forms of the invention herein described.

I claim:

1. A wear member comprising a mass of rubber composition and a reinforcement of yucca wood embedded therein.

2. A rubber tread for footwear comprising a body of rubber permanently secured to a backing element of yucca wood.

3. A rubber tread for footwear comprising a body of vulcanized rubber permanently united to a backing of a coarse-fibered, natural wood having spaces between the fibers which are substantially as wide as the said fibers.

4. A rubber tread for footwear comprising a body of vulcanized rubber and a backing element of yucca wood permeated throughout with vulcanized rubber integral with said body.

5. A rubber tread member for footwear having permanently incorporated with the rubber a backing of yucca wood with the fibers thereof disposed transversely of said tread member.

In witness whereof I have hereunto set my hand this 22nd day of September, 1927.

WALTER W. EVANS.